(12) United States Patent
Neftik et al.

(10) Patent No.: US 11,299,426 B2
(45) Date of Patent: Apr. 12, 2022

(54) PROCESS FOR MANUFACTURING AGGLOMERATED STONE SLAB

(71) Applicants: Igor Neftik, Nazareth Illit (IL); Edward Berkovsky, Yokneam Illit (IL)

(72) Inventors: Igor Neftik, Nazareth Illit (IL); Edward Berkovsky, Yokneam Illit (IL)

( * ) Notice: Subject to any disclaimer, the term of this patent is extended or adjusted under 35 U.S.C. 154(b) by 423 days.

(21) Appl. No.: 16/090,823

(22) PCT Filed: Apr. 6, 2017

(86) PCT No.: PCT/IL2017/050417
§ 371 (c)(1),
(2) Date: Oct. 3, 2018

(87) PCT Pub. No.: WO2017/175226
PCT Pub. Date: Oct. 12, 2017

(65) Prior Publication Data
US 2019/0092690 A1    Mar. 28, 2019

(30) Foreign Application Priority Data
Apr. 6, 2016   (IL) .......................................... 244957

(51) Int. Cl.
| | | |
|---|---|---|
| C04B 28/00 | (2006.01) |
| C04B 35/64 | (2006.01) |
| C04B 35/626 | (2006.01) |
| C04B 111/10 | (2006.01) |
| C04B 32/02 | (2006.01) |
| C03C 14/00 | (2006.01) |
| C04B 28/26 | (2006.01) |
| C04B 20/00 | (2006.01) |
| C04B 40/00 | (2006.01) |

(52) U.S. Cl.
CPC .............. *C04B 32/02* (2013.01); *C03C 14/00* (2013.01); *C04B 20/0048* (2013.01); *C04B 28/00* (2013.01); *C04B 28/26* (2013.01); *C04B 35/62655* (2013.01); *C04B 35/64* (2013.01); *C04B 40/0071* (2013.01); *C04B 40/0082* (2013.01); *C04B 2111/10* (2013.01); *C04B 2235/3418* (2013.01); *C04B 2235/3427* (2013.01); *C04B 2235/3436* (2013.01); *C04B 2235/3463* (2013.01); *C04B 2235/36* (2013.01); *C04B 2235/602* (2013.01)

(58) Field of Classification Search
None
See application file for complete search history.

(56) References Cited

U.S. PATENT DOCUMENTS

| | | |
|---|---|---|
| 3,963,506 A | 6/1976 | Shutt et al. |
| 5,244,850 A | 9/1993 | Dutton |
| 5,649,987 A | 7/1997 | Greulich |
| 2005/0147806 A1 | 7/2005 | Toncelli et al. |
| 2015/0299032 A1 | 10/2015 | Bremmer et al. |

FOREIGN PATENT DOCUMENTS

| | | |
|---|---|---|
| DE | 278919 A3 * | 5/1990 |
| JP | S58145628 | 8/1983 |
| JP | H02107548 | 4/1990 |

OTHER PUBLICATIONS

DD 278919 A3 (Muecke) May 23, 1995 (English language machine translation). [online] [retrieved Dec. 9, 2020]. Retrieved from: Google Patents. (Year: 1995).*

JP S58-145628 A (Ohashi) Aug. 30, 1983 (English language machine translation). [online] [retrieved Aug. 12, 2020]. Retrieved from: Espacenet. (Year: 1983).*

"Standard Terminology Relating to Refractories", ASTM Compass [online]. Oct. 2018 [retrieved on Jul. 22, 2021]. Retrieved from the Internet: <URL: https://compass.astm.org/EDIT/html_annot.cgi?C71+12(2018)>. (Year: 2018).*

* cited by examiner

*Primary Examiner* — Erin Snelting
(74) *Attorney, Agent, or Firm* — Vorys, Sater, Seymour and Pease LLP; Anthony Venturino

(57) ABSTRACT

The process of the invention presents a simple, effective and continuous process for producing slabs and panels from compositions free from ceramic components or ceramic binders.

13 Claims, No Drawings

PROCESS FOR MANUFACTURING AGGLOMERATED STONE SLAB

GENERAL FIELD OF THE INVENTION

The invention generally concerns processes for the preparation of glass-containing slabs of agglomerated stone and ceramic slabs prepared by said processes.

BACKGROUND

Analysis of developmental tendencies in the slab production industry in the last two decades showed a shift in the technological approach to the manufacture of slabs and panels. The reason for the technological shift resides mainly in the difficulties associated with production of complex chemical mixtures and products suffering from mechanical complications.

Slabs and panels from ceramic materials, manufactured at high sintering temperatures above 1,200° C., suffer from low resistance to thermal shock as a result of high internal thermal stresses and are known to crack and break during processing or mechanical treatments. It is known that the inadequate resistance to thermal shock varies along the full length of the slab, such that temperature changes in the body give rise to strongly changing tensile and compressive stresses. These stresses being parallel to the surface of the object cause the eventual fracture in the slab. Great difference in coefficients of thermal expansion in composite material too can be source of internal stresses. Thus far, thermal stresses are compensated or prevented in part by manufacturing slabs of reduced thicknesses and/or introduction of high-melting transparent inorganic materials in the form of yarns, fibers or whiskers. In the case of such materials, they work as barriers in the path of crack propagation and arrest its spreading along the length of the product.

US Patent Publication No. 2015/0299032 [1] discloses a composite material for ceramic tiles, stone cladding, surface tops and other products. The composite materials are mainly waste products, mainly glass components. As the products do not utilize binders to hold the materials together, the product may be realized at high temperatures.

U.S. Pat. No. 5,649,987 [2] discloses a process for producing tabular building and decorative materials that are similar to natural stone and are said to have high strength for the facing of facades, walls and floors in interior and exterior applications. The technology utilizes large amounts of glass waste and thus may be said to produce a classical glass slab.

U.S. Pat. No. 5,264,268 [3] discloses preparation of ceramic plates from stone materials with ceramic materials and ceramic binders. The mixture formed from these materials is distributed onto a plane delimited from a containing frame and subjected to simultaneous action of vacuum and vibratory motion combined with a pressing action. After the molding step, a drying step and a firing step follow. The resulting plate has high mechanical properties and is highly resistant to atmospheric and chemical agents.

US Patent Publication No. US2005/0147806 [4] discloses a process for manufacturing of slabs and panels of ceramic materials using vacuum vibrocompaction. According to the disclosed process the slabs are formed from a mix formed using ceramic sands.

REFERENCES

[1] US Patent Publication No. 2015/0299032
[2] U.S. Pat. No. 5,649,987
[3] U.S. Pat. No. 5,264,268
[4] US Patent Publication No. US2005/0147806

GENERAL DESCRIPTION

Currently available processes for the production of slabs and panels utilize ceramic materials and ceramic binders, which require the application of very high processing temperatures. To reduce high processing temperatures, that are responsible for increased internal stresses in the final product, following a cooling (annealing) step, various measures have been taken to modify the processing conditions and/or nature and selection of additives added to the initial ceramic composition. In some instances, additives such as sodium silicate have been added in an attempt to reduce sintering temperatures; however, a dramatic lowering of the processing temperature was not observed. Similarly, vacuum and vibrocompaction were used.

Unlike processes of the art, the process of the invention presents a simpler, more effective and continuous process for producing slabs and panels as disclosed herein. The process of the invention does not utilize nor is based on ceramic components or ceramic binders, nor necessitates the application of vacuum and vibration treatments.

The inventors of the technology disclosed herein have developed a novel and unique process for the mass production of slabs and panels. The process of the invention may be generally carried out at a temperature much lower than temperatures utilized in corresponding ceramic processes, and therefore permits production of slabs of greater thickness, higher stability under environmental conditions, greater mechanical hardness and various other mechanical and chemical characteristics.

Generally speaking, the process of the invention allows transforming a solid dry mixture, formed of stone aggregates and a glossy binder, into high quality compound stone slab. Such a transformation may be carried out by using compaction, but since the initial material mixture does not include nor utilizes viscous resin binders, compression suffices. Preparation of a Ready-to-Press (RTP) powder can be achieved not only by way of mechanical mixing, but also by e.g., spray drying. This method gives the possibility to achieve a more homogeneous RIP Powder and as a result to make compression or pressing steps simpler.

In accordance with the process of the invention, a solid dry mixture is molded and compacted into a suitable mold, which may be driven into a molding machine, for forming a compacted slab. Thereafter, the compacted green-body is heat treated. Subsequent post-treatment steps may include calibration, in order to clean the slab faces and let the material texture be exposed; and polishing.

Thus, in accordance with the above methodology, the invention generally provides compositions of matter for use in the production processes of the invention, processes and final products. The compositions of matter of the invention, are free of ceramic components or materials.

As used herein, a "ceramic component" or "ceramic material" refers to any technical crystalline or partially crystalline inorganic, non-metallic solid that is prepared or may be prepared by the action of heat and subsequent cooling. While glass may be classified as a type of ceramic, glass is amorphous by nature and therefore excluded from the scope of the term as used herein. Thus, the ceramic component is a crystalline or partially crystalline inorganic, non-metallic solid that is characterized by a crystalline order (namely that is non-amorphous).

The term "ceramic binder" is loosely used herein to include binders capable of binding ceramic heating materials into a solid mass. The binder is not necessarily ceramic in composition.

In a first aspect of the invention, there is provided a solid dry mixture, or composition of matter, comprising a plurality of granulates of stone or sand (e.g., being in the form of aggregates or agglomerates of stone), at least one binding material (that is not a ceramic binder), at least one reinforcing material and at least one additive, wherein said at least one binding material consists or comprises glass having a working point (according to ASTM) or a sintering temperature below 1,200° C., preferably below 900° C.;

and wherein each of said plurality of granulates of stone having an averaged grain size smaller than 7 mm.

In another aspect, there is provided a composition of matter comprising granulated sand, at least one glass material, at least one reinforcing material and at least one additive, wherein said at least one glass material having a working point (according to ASTM) or a sintering temperature below 1,200° C., preferably below 900° C.;

and wherein said granulated sand having an averaged grain size smaller than 1.5 mm.

The solid dry mixture referred to herein as a "composition of matter" is the initial mixture of solid components from which slabs and panels are eventually processed, are objects of the invention characterized as material combinations of the various components recited herein. Typically, the mixture comprises solid components in a desired overall amount (weight or volume), at a material ratio depending on the final utility of application. The mixture may be of any form, such as an aggregation (collection) of unpacked form, a packed or packaged form, a mixed form, a homogenous mixture, a non-homogenous mixture, a dry composition, a wet composition, a layered composition, a spread-out composition, a sintered or unsintered composition and so forth.

The bulk material of a mixture/composition of the invention is typically a natural material, namely a material present or derived from nature, that is in the form of aggregates or stone agglomerates. The bulk material is at least one such material or a combination of different materials, wherein said at least one material or said combination constitutes the major component of the composition of matter. As stated herein, the bulk material, being one or a combination of several such materials, is presented in granulated form. In other words, the bulk material is in the form of a plurality of particles or grains, which may be of the same size, or constitute a mixture of various grain populations varying in size or varying in size and in at least one other characteristic such as material constitution, form, color, mechanical stability, etc. In some embodiments, the granulated material is a selection of materials grains of an average size smaller than 7 mm (diameter or longest axis). In some embodiments, the average grain size is between 1 and 7 mm. in other embodiments, the composition comprises a plurality of material grain populations, wherein each population varied in grain size, provided that the average size in the combined populations is smaller than 7 mm.

In some embodiments, the average grain size is smaller than 7 mm. In some embodiments, the average grain size is smaller than 6 mm. In some embodiments, the average grain size is smaller than 5 mm. In sonic embodiments, the average grain size is smaller than 4 mm. In some embodiments, the average grain size is smaller than 3 mm. In some embodiments, the average grain size is smaller than 2 mm. In some embodiments, the average grain size is smaller than 1 mm.

In some embodiments, the average grain size is between 1 and 7 mm. In some embodiments, the average grain size is between 1 and 6 mm. In some embodiments, the average grain size is between 1 and 5 mm. In some embodiments, the average grain size is between 1 and 4 mm. In some embodiments, the average grain size is between 1 and 3 mm. In some embodiments, the average grain size is between 2 and 7 mm. In some embodiments, the average grain size is between 2 and 6 mm. In some embodiments, the average grain size is between 2 and 5 mm. In some embodiments, the average grain size is between 2 and 4 mm. In some embodiments, the average grain size is between 3 and 7 mm. In some embodiments, the average grain size is between 3 and 6 mm. In some embodiments, the average grain size is between 3 and 5 mm. In some embodiments, the average grain size is between 4 and 7 mm. In some embodiments, the average grain size is between 4 and 6 mm. In some embodiments, the average grain size is between 5 and 7 mm.

In some embodiments, the average grain size is between 0.1 and 1.5 mm.

The bulk material is, in some embodiments, a natural material. In some embodiments, the material is selected from quartz, granite, porphyry, syenite, basalt, sandstone and sand, each of which being optionally in the form of granules, particles, aggregates or agglomerates.

In some embodiments, the at least one bulk material is a natural material selected from sand and sandstone. In some embodiments, the sand or sandstone material is in a form of granulates or granules having an average granule size of below 7 mm, or between 0.1 and 1.5 mm.

Where the grain or granule size is small and the material aggregates are formed or are present, the overall size of the aggregates should not he larger than 7 mm.

A mixture or composition of matter according to the invention comprises also at least one binding material. The binding material may be a single material or a combination of materials (binding or adhesive system) which together permit binding, adhesiveness or association of the various components in the slag product to each other. The at least one binding material is selected to permit adhesiveness or binding following thermal treatment.

In accordance with the invention, suitable binding agent or binding system should be selected to have a working temperature or sintering temperature below 1,200° C., or below 900° C. In other words, the binding material or binding system provides binding between the various solid components of the composition only after the thermal treatment at the temperature of the composition as a whole was raised to a temperature above 450° C. and below 900° C. In some embodiments, the temperature is between 450 and 900° C., between 500 and 900° C., between 550 and 900° C., between 600 and 900° C., between 650 and 900° C., between 700 and 900° C., between 750 and 900° C., or between 800 and 900° C.

In some embodiments, the temperature is between 450 and 700° C., between 500 and 700° C., between 550 and 700° C. or between 600 and 700° C.

The binding material or binding system is based on a glass material, namely may comprise or consist of at least one glass material. As used herein, the glass material (or glass) encompasses any desired glasses, for example lead glass, soda-lime glass, borosilicate glass, phosphate and phosphosilicate glasses, borophosphosilicate glass, opaque glass, ceramic glazes, and separated wastes of glass materials from, e.g., the glass industry. Typically, the at least one glass material is in a form of powders or glass frits. Alternatively, two or more types of glass may be used, for example: low melting fritted glass, fritted glaze and/or fritted waste glasses for regulating the sintering temperature and thermal expansion.

Amongst the available glass materials, the glass material for use in accordance with the invention is selected based on the glass "working point" and thermal expansion coefficient (CTE). The glass working point is the temperature at which the glass has a viscosity of about $10^4$ poise. Thus, a glass material suitable for use in accordance with processes of the invention is selected amongst glasses having a viscosity of about $10^4$ poise at a temperature below 900° C. Difference in CTE of glass and aggregate materials must not he great, because it is a source of internal stresses in a body.

Thus, in some embodiments, the glass is selected amongst glass materials having a working point (according to ASTM) or a sintering temperature below 900° C., as recited herein.

In some embodiments, in a composition of the invention said glass material constitutes at least 25% of the total weight of the composition (w/w).

The "reinforcing material" is typically a high-melting transparent inorganic material that is in a form of yarns, fibers or whiskers. These materials work as barriers in the path of crack propagation and arrest its spreading along the length of the product.

The mixture or composition of the invention may comprise at least one functional or non-functional additive. The additive may be selected based on the function it is intended to play in the composition or green body. In some embodiments, the at least one additive is selected to remain solid at the processing temperature, namely it is selected to remain substantially unchanged, unmodified under the processing temperature. In further embodiments, the at least one additive is selected to undergo phase change at the processing temperature or undergo a reaction with at least one other component in the composition of the invention or in the green-body during processing, or is intended to undergo decomposition or degradation, thereby leaving behind a vacancy or pore.

In some embodiments, the at least one additive is selected amongst at least one pressing agent, at least one dispersing agent, at least one reinforcing material, at least one plasticizer, at least one pore-forming material and at least one stabilizer.

The composition or dry mixture of the invention may be in a spread-out form, wherein the various components of the composite are in contact with other components of the composition. In other words, the composition of matter comprising the various components, as disclosed herein, may be layered in a mold of a desired shape and size in such a way that the components are in contact with each other. The shape and size of the mold may vary and selected based on, inter alia, the particular composition, the composition weight or volume, the product to be manufactured, the desired or intended processing steps, the degree of processing that may be required and others.

Generally, the mixture or composition may be shaped into a green-body, namely into an object of any size and form ready for thermal treatment. Following such a treatment, the green body converts into a sintered object wherein the binding agent or binding system unifies or associates the components into a continuous material. In some embodiments, the final product obtained following thermal treatment is a slab or a panel.

Thus, the composition of the invention is suitable or otherwise may be engineered for use in a process for manufacturing slabs or panels. In some embodiments, the slabs or panels arc substantially flat.

In some embodiments, the process comprises thermal treatment of the composition or the green-body at a temperature below 900° C.

The processing temperature, namely—the highest temperature employed in the processing of the composition or the green-body to form a slab or panel, is the temperature at which full sintering of the composition is achieved. As noted herein, the binding material or binding system is selected such that binding is achieved at the working point (according to ASTM) of the binding material or binding system. Thus, the processing temperature may be varied based on the particular composition and the particular binding agent or system utilized, e.g., glass utilized.

Thus, in another aspect of the invention, there is provided a process for manufacturing an article, e.g., a slab or a panel, the process comprising thermal treatment of a composition or a green-body according to the invention, the thermal treatment comprises heating the composition or green-body at a temperature below 900° C.

In some embodiments, the process comprises:
 obtaining a mixture or composition or a green-body according to the invention; and
 heating said composition or green-body at a temperature below 900° C.

In some embodiments, the process comprises compacting the mixture in a mold. In some embodiments, compacting is achievable by any mechanical means known in the field, to reduce as much as possible the inter-particle or inter-grain distance.

The invention further provides a process for manufacturing a slab, the process comprising thermal treatment of a composite material according to the invention, wherein said thermal treatment is carried out at a temperature below 900° C.

In some embodiments, the mixture comprises granulated sand, at least one glass material, at least one reinforcing material, and at least one additive, said at least one glass material having a working point (according to ASTM) or a sintering temperature below 900° C., and wherein said granulated sand having an averaged grain size smaller than 1.5 mm.

In some embodiments, the glass material comprises at least 25% of the total weight of the composite (w/w).

In some embodiments, the at least one binding material consists glass material.

In some embodiments, the working point temperature is between 450 and 900° C.

The invention further provides a process for manufacturing a plate, e.g., a slab of agglomerated stone material starting from a natural stone material (of natural origin) or sand, the process comprising:

(a) preparation of a dry mixture in the form of a glass or glass-ceramic-containing mixture, the mixture comprising a binding phase and a granulate having particles of maximum size consistent with a thickness of a final compacted plate, as defined herein, said granulate being obtained from natural stone materials having a widely variable granule size and selected from feldspars, porphyry, granites and quartz materials, or from sand, said binding phase consisting of powders of glass moistened with water;

(b) molding into a form of a plate the mixture of step (a) and distributing or compacting the mixture onto a molding support, e.g., by a simultaneous application of a vibration action and of a pressing action onto the distributed mixture;

(c) drying the molded product at a temperature lower than that of a glass sintering temperature and for a time period desired to obtain a dry product; and (d) sintering the molded and dried product at a temperature of between 450° C. and 900° C. to obtain a plate.

In some embodiments, the ratio between the binding phase to the granulate is between 0.35 and 0.55 by volume.

In other embodiments, the maximum size of the granules is less than ⅓ of the thickness of the final compacted plate.

In further embodiments, the pressure is at least 0.5 kg/sq. cm.

In another aspect, there is provided an article, e.g., slab or panel, prepared by a process of the invention.

The invention further provides a sintered or thermally treated article comprising a plurality of granulates of at least one matrix or bulk material, at least one binding material, at least one reinforcing material and at least one additive, said at least one binding material consists or comprises glass, and wherein said each of said granulates having an averaged grain size smaller than 7 mm.

As used herein, the term "sintered" or any lingual variation thereof refers to thermal treatment with the purpose densification or fusing together the various materials making up a composition of the invention, into a continuous solid material. Without wishing to be bound by theory, upon heating a composition of matter according to the invention at a processing temperature, as defined herein, at least the binding material, e.g., the glass material diffuses across the glass particle boundaries or penetrates in a semi-liquid state in spaces between particles, comes into contact with another of the particles present next thereto. Upon contact, the materials fuse together to form, upon cooling, the compact continuous solid material (or body). Thus, a sintered article according to the invention refers to such a composition having undergone particle fusion to form a continuous solid article.

For certain applications, the slabs and panels may be manufactured with higher thermal insulation and better acoustic properties. In such cases, pore-forming agents may be introduced into the dry mix in order to increase porosity of the solid article after sintering. A great variety of pore-forming materials may be used. These include materials that undergo decomposition at the processing temperature and conditions, leaving behind a pore or a vacancy. Such materials may be selected from industrial materials as well as starch (derived from potato, wheat, corn, and rice starch), wheat particles, graphite and others.

In some embodiments, the article is selected amongst slabs and panels.

In some embodiments, the article is a slab.

As known in the art, a "slab" is a flat solid article. The slab according to the invention is a flat solid object produced from a composition or green-body according to the invention. The slab may be manufactured in a ready-for-use form or may be further manipulated or post-treated to provide the final article of use. In view of the conditions utilized in processes of the invention, mainly the relatively low sintering temperatures, being lower than 900° C., slabs of greater thicknesses may be produced. As slabs according to the invention are much less prone to cracking and other mechanical deformations due to the processing steps employed and the selected material combination, a great variety of slab thicknesses may be achieved.

In some embodiments, the slab thickness is between 7 mm and 40 mm. In some embodiments, the slab thickness is between 7 mm and 30 mm, 7 mm and 20 mm, between 7 mm and 10 mm, between 10 mm and 40 mm, between 10 mm and 30 mm, between 10 mm and 20 mm, between 20 and 50 mm. In some embodiments, the slab thickness is between 20 and 45 mm, between 20 and 40 mm, between 20 and 35 mm, between 20 and 30 mm, between 20 and 25 mm, between 25 and 50 mm, between 25 and 45 mm, between 25 and 40 mm, between 25 and 35 mm, between 25 and 30 mm, between 30 and 50 mm, between 30 and 45 mm, between 30 and 40 mm, between 30 and 35 mm, between 35 and 50 mm, between 35 and 45 mm, between 35 and 40 mm, between 40 and 50 mm, between 45 and 50 mm, or between 40 and 45 mm.

In some embodiments, the slab comprises glass and is free of glass fibers.

As a person of skill in the art would realize, slabs of the invention exhibit characteristics superior to those attributed to slabs of the art.

In some embodiments, the slab is characterized by water absorption of less than 0.01%.

In some embodiments, the slab is characterized by hardness of at least 8 Mohs.

In some embodiments, the slab is characterized by abrasive resistance of below 110 $mm^3$.

In some embodiments, the slab is characterized by compressive strength of at least 5,000 $kg/cm^2$.

In some embodiments, the slab is characterized by brightness of 100%.

DETAILED DESCRIPTION OF EMBODIMENTS

The following are non-limiting examples of certain embodiments of the present invention.

EXAMPLE 1

Mixture for the production of slabs, processing temperatures between 750 and 930° C.:

| | |
|---|---|
| Glass (glaze compositions) | 35% |
| Sand (grain 0.4-0.8 mm) | 45% |
| Sand (grain 0.1-0.3 mm) | 15% |
| Fiber (Reinforcing additive) | 2% |
| Technological additives | 3% |

EXAMPLE 2

Mixture for the production of slabs, processing temperatures between 600 and 750° C.:

| | |
|---|---|
| Glass (low-melting glass compositions) | 30% |
| Aggregate (grain 2.5-5 mm) | 15% |
| Aggregate (grain 1.5-2.5 mm) | 15% |
| Aggregate (grain 1-1.5 mm) | 10% |
| Aggregate (grain 0.4-0.8 mm) | 10% |
| Aggregate (grain 0.1-0.3 mm) | 15% |
| Fiber (Reinforcing additive) | 2% |
| Technological additives | 3% |

EXAMPLE 3

The mixture of Example 1 above was utilized in the manufacture of a slab, without mechanical treatment of the slab upper surface for the purpose of decorating this surface for a final product.

EXAMPLE 4

The mixture of Example 2 above was utilized in the manufacture of a slab. which was further dressed and polished. This product was characterized with a high aesthetical properties, e.g., having better optical characteristics.

The invention claimed is:

1. A process for manufacturing an agglomerated stone slab, the process comprising:
   sintering a mixture comprising
      a glass binding phase, wherein the glass is not soda lime glass; and
      a bulk matrix of granulates of agglomerated stone having particles of an average size between 0.1 and 1.5 mm, wherein the maximum particle size is consistent with a thickness of a final compacted agglomerated stone slab;
   wherein a ratio between the binding phase to the bulk matrix is between 0.34 to 0.55 by volume;
   and wherein said sintering is carried out at a temperature of between 450° C. and 700° C. to obtain the agglomerated stone slab, wherein said mixture contains no ceramic materials.

2. The process according to claim 1, wherein said bulk matrix include at least one natural material selected from quartz, granite, porphyry, syenite, basalt, sandstone and sand.

3. The process according to claim 1, wherein said glass is in a form of at least one of glass powder and glass frits.

4. The process according to claim 1, further comprising compacting the mixture to form a green-body.

5. The process according to claim 4, wherein said compacting includes applying a pressure of at least 0.5 kg/sq. cm.

6. The process according to claim 1, wherein said agglomerated stone slab is characterized by a water absorption of less than 0.01%.

7. The process of claim 1, further comprising: compacting the mixture prior to said sintering utilizing vibro-compression.

8. The process of claim 7, wherein said compacting is onto a molding support, the process further comprising:
   molding said mixture into a form of a plate prior to said sintering.

9. The process of claim 1, further comprising:
   adding an additive selected for at least one property from the group consisting of plasticizing the mixture, stabilizing the mixture, remaining solid at the working point temperature, undergoing a phase change at temperature of said sintering, undergoing a reaction with at least one other component in the mixture during processing, and undergoing decomposition or degradation, thereby leaving behind a vacancy or pore in the mixture.

10. The process of claim 1, further comprising:
    adding to said mixture a reinforcing material that remains solid at the temperature of said sintering.

11. The process of claim 10, wherein said reinforcing material includes an inorganic fiber.

12. The process of claim 10, wherein said reinforcing material is transparent.

13. The process of claim 1, further comprising:
    spray drying the mixture prior to said sintering.

* * * * *